April 19, 1966   A. P. KIZILOS   3,247,341
CONTROL APPARATUS
Filed Jan. 23, 1964
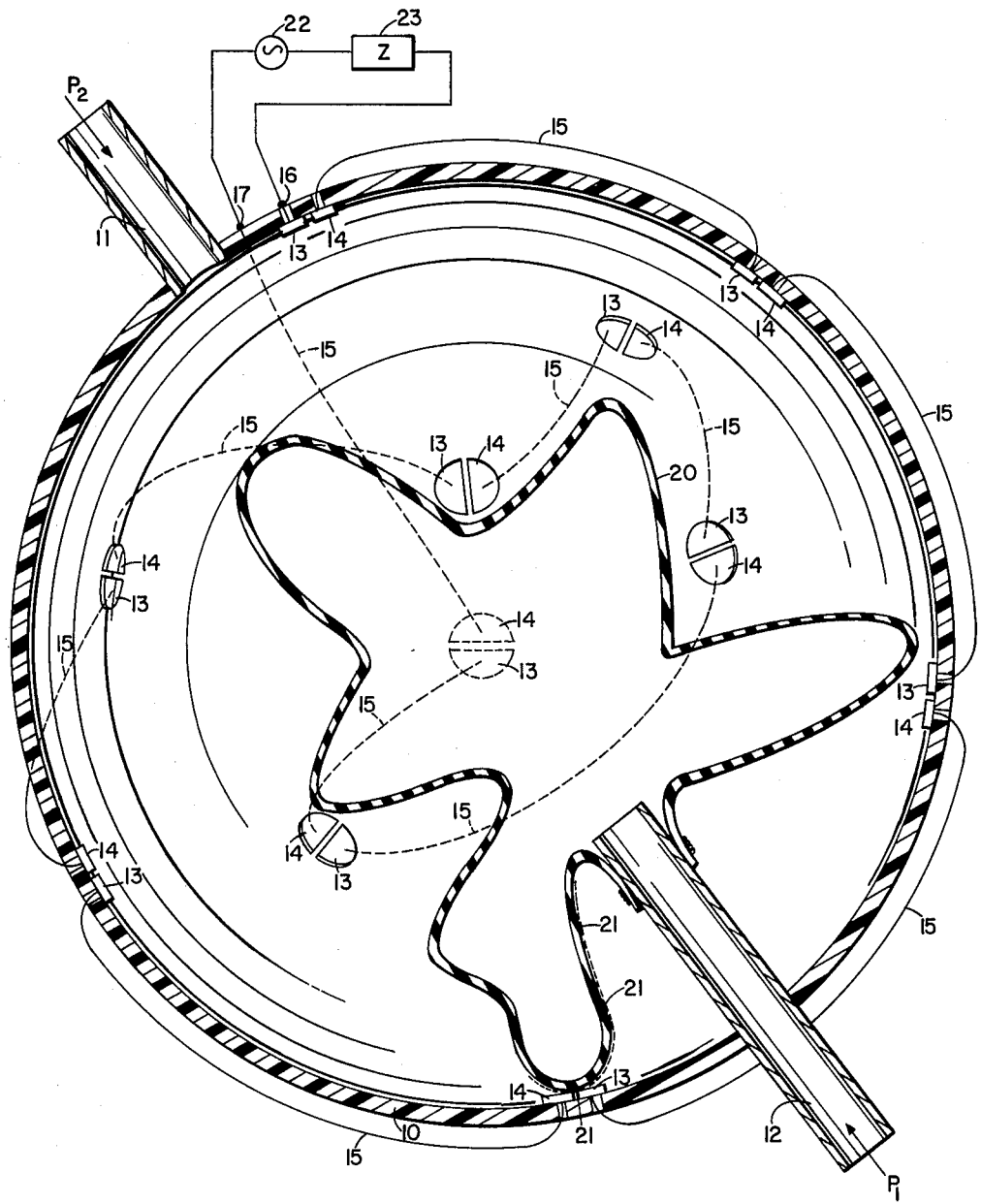
INVENTOR.
APOSTOLOS P. KIZILOS
BY *George W. Field*
ATTORNEY United States Patent Office 3,247,341
Patented Apr. 19, 1966

3,247,341
CONTROL APPARATUS
Apostolos P. Kizilos, Minnetonka, Minn., assignor to Honeywell Inc., a corporation of Delaware
Filed Jan. 23, 1964, Ser. No. 339,709
7 Claims. (Cl. 200—83)

This invention relates to the field of control apparatus, and more particularly to improved fluid operated electrical switching means.

It is often desirable to control an electrical circuit in accordance with the output of one or more fluid devices such as fluid amplifiers, where the available energy, in the form of pressure differential for example, is limited. Frequently these situations occur in instruments where vibration is a significant factor, and it is important that the circuit being switched remain reliably energized as long as the fluid output remains within a first range, and becomes reliably de-energized when the fluid output falls in another range.

It is a principal object of the present invention to provide an improved elecric switch. Another object is to provide an improved switch, actuable by the output of a fluid device, which requires little fluid energy and which has a high degree of immunity to vibration.

Various other objects, advantages, and features of novelty not individually enumerated above which characterize my invention are pointed out with particularity in the claims annexed hereto and forming a part hereof. However, for a better understanding of the invention, its advantages, and objects attained by its use, reference should be had to the sub-joined drawing, which forms a further part hereof, and to the accompanying descriptive matter, in which I have illustrated and described a preferred embodiment of my invention.

The single figure of the drawing is a somewhat schematic sectional showing of switching means according to the invention. In the figure a housing 10 is shown as of spherical configuration, and as having a pair of conduits 11 and 12 communicating with its interior. A plurality of pairs of electrical contacts 13, 14 are secured to or moulded into the inner surface of housing 10 and are interconnected by a plurality of electrical connectors 15, to comprise a single series circuit having terminals 16 and 17.

Contained within housing 10 is an inflatable member or balloon 20 secured to the inner end of conduit 12, which communicates with its interior. The external surface of member 20 has printed or otherwise carried thereon a mosaic of electrically isolated conductive areas 21, each area being of sufficient size to bridge the gap between a pair of contacts 13, 14, as suggested in the figure.

An electrical circuit to be controlled, including a source 22 and a utilization device 23, is connected to terminals 16 and 17, and a pair of outputs from one or more suitable fluid devices, such a fluid amplifiers or pneumatic valves, are supplied to conduits 11 and 12. Then as long as the output supplied to conduit 11 is less than that supplied to conduit 12, member 20 is inflated, every pair of contacts 13, 14 is bridged by one or more of areas 21, and a complete electric circuit may be traced from terminal 16 to terminal 17.

Only a relatively modest amount of fluid energy is required to maintain member 20 in a distended condition, and the small mass of the member makes it very insensitive to vibration and acceleration.

If the output supplied to conduit 11 becomes greater than that supplied to conduit 12, member 20 is deflated and many if not all of areas 21 move out of the positions in which they bridge between contacts 13 and 14. While due to gravity or vibration the deflated member may be or become so displaced relative to the housing that one or more of areas 21 may bridge pairs of contacts, it is necessary that all pairs of contacts be bridged before the switch can be operated, and in the deflated state of member 20 this is impossible.

While I have shown housing 10 as spherical, it will be appreciated that this is not essential to the operation of the invention, and it will also be perceived that other means, such as a body of conductive fluid between member 20 and housing 10, could also be used to accomplish the invention.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. In combination: a housing; pairs of spaced electrical contacts distributed over the inner surface of said housing in many axes; means connecting said pairs of contacts to comprise a single series circuit; an inflatable member contained within said housing; a mosaic of electrically isolated conductive areas on the outer surface of said member, each area being of sufficient size to bridge the space between the contacts of said pairs; and conduit means communicating with the inside of said member, whereby when the fluid pressure within said member is greater than that within said housing but outside said member, said areas bridge the spaces between the contacts of all said pairs, to close said series circuit.

2. In combination: a housing; pairs of spaced electrical contacts distributed over the inner surface of said housing; means connecting said pairs of contacts to comprise a single series circuit; an inflatable member contained within said housing; a mosaic of electrically isolated conductive areas on the outer surface of said member, each area being of sufficient size to bridge the space between the contacts of said pairs; and conduit means independently communicating with the insides of said housing and of said member, whereby when the fluid pressure within said member is greater than that within said housing but outside said member, said areas bridge the spaces between the contacts of all said pairs, to close said series circuit.

3. In combination: a housing; pairs of spaced electrical contacts distributed over the inner surface of said housing; means connecting said pairs of contacts to comprise a single series circuit; an inflatable member contained within said housing; and electrically independent means actuated by inflation of said member to severally bridge the spaces between the contacts of all said pairs.

4. In combination: a housing; pairs of spaced electrical contacts distributed over the inner surface of said housing; means connecting said pairs of contacts to comprise a single series circuit; an inflatable member contained within said housing; means actuated by inflation of said member of independently bridge the spaces between the contacts of the several pairs; and conduit means communicating with the inside of said inflatable member.

5. In combination: a housing; pairs of spaced electrical contacts distributed over the inner surface of said housing; means connecting said pairs of contacts to comprise a single series circuit; an inflatable member contained within said housing; mutually insulated means actuated by inflation of said member to jointly bridge the spaces between the contacts of all said pairs; and conduit means independently communicating with the inside of said inflatable member and with the space between said housing and said member.

6. In combination: a housing; an inflatable member contained within said housing, the inner surface of said housing and the outer surface of said member comprising operating surfaces; pairs of spaced electrical contacts distributed over one of said operating surfaces; means connecting said pairs of contacts to comprise a single series circuit; a mosaic of electrically isolated conductive areas on the other of said operating surfaces, each area being of sufficient size to bridge the space between the contacts of said pair; and conduit means independently communicating with the insides of said housing and said member, whereby when the fluid pressure within said member is greater than that within said housing but outside said member, said areas bridge the spaces between the contacts of all said pairs, to close said series circuit.

7. In combination: a housing; a first pair of closely spaced electrical contacts carried by the inner surface of said housing; a second pair of closely spaced electrical contacts carried by the inner surface of said housing at a location displaced from said first pair; means electrically interconnecting first contacts of said pairs, and means for making independent electrical connection to the second contacts of said pairs, so that said pairs of contacts are connected in a single series circuit; an inflatable member contained within said housing for inflation to engage said inner surface; and electrically independent means actuable upon inflation of said member to severally bridge the spaces between the contacts of said series, so as to complete said series circuit.

References Cited by the Examiner
UNITED STATES PATENTS

| | | | |
|---|---|---|---|
| 2,254,673 | 9/1941 | Barbat | 200—83 |
| 2,786,488 | 3/1957 | Mercier | 92—92 |

BERNARD A. GILHEANY, *Primary Examiner.*

ROBERT K. SCHAEFER, *Examiner.*

G. MAIER, *Assistant Examiner.*